United States Patent
Yang

(10) Patent No.: US 12,089,280 B2
(45) Date of Patent: Sep. 10, 2024

(54) METHOD AND APPARATUS FOR PROCESSING RESOURCES

(71) Applicant: BEIJING XIAOMI MOBILE SOFTWARE CO., LTD., Beijing (CN)

(72) Inventor: Xing Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 414 days.

(21) Appl. No.: 17/762,483

(22) PCT Filed: Sep. 24, 2019

(86) PCT No.: PCT/CN2019/107567
§ 371 (c)(1),
(2) Date: Mar. 22, 2022

(87) PCT Pub. No.: WO2021/056196
PCT Pub. Date: Apr. 1, 2021

(65) Prior Publication Data
US 2022/0346179 A1  Oct. 27, 2022

(51) Int. Cl.
*H04W 76/27* (2018.01)
*H04W 72/20* (2023.01)
(Continued)

(52) U.S. Cl.
CPC .......... *H04W 76/27* (2018.02); *H04W 72/20* (2023.01); *H04W 72/30* (2023.01); *H04W 76/38* (2018.02); *H04W 92/18* (2013.01)

(58) Field of Classification Search
None
See application file for complete search history.

(56) References Cited

U.S. PATENT DOCUMENTS

| 2010/0113015 A1* | 5/2010 | Casati | H04W 60/04 |
| | | | 455/432.1 |
| 2015/0264663 A1* | 9/2015 | Chen | H04W 76/14 |
| | | | 455/450 |

(Continued)

FOREIGN PATENT DOCUMENTS

CN  106488384 A  3/2017

OTHER PUBLICATIONS

3GPP RAN WG2 Meeting #104 R2-1816788 Spokane, USA, Nov. 12-16, 2018 Source: InterDigital Inc. (Year: 2018).*

(Continued)

*Primary Examiner* — German Viana Di Prisco
(74) *Attorney, Agent, or Firm* — Cozen O'Connor

(57) ABSTRACT

A method and an apparatus for allocating processing resources may be used in a wireless communication network. The method includes: configuring by a base station, a first sidelink resource pool and a second sidelink resource pool. The first sidelink resource pool is a resource pool of sidelinks that can be used by a user equipment (UE) after entering an idle state or an inactive state, and the second sidelink resource pool being a resource pool of sidelinks that can be used by the UE in the idle state or the inactive state after the first sidelink resource pool has been released. The method further includes: sending by the base station, information of the first sidelink resource pool and information of the second sidelink resource pool to the UE.

20 Claims, 8 Drawing Sheets

(51) Int. Cl.
*H04W 72/30* (2023.01)
*H04W 76/38* (2018.01)
*H04W 92/18* (2009.01)

(56) References Cited

U.S. PATENT DOCUMENTS

| | | | | |
|---|---|---|---|---|
| 2015/0327211 | A1* | 11/2015 | Aramoto | H04W 64/003 |
| | | | | 370/328 |
| 2016/0345374 | A1* | 11/2016 | Zhang | H04W 72/21 |
| 2017/0142741 | A1* | 5/2017 | Kaur | H04W 72/02 |
| 2017/0230938 | A1* | 8/2017 | Huang | H04W 72/02 |
| 2017/0295567 | A1* | 10/2017 | Chen | H04W 4/70 |
| 2018/0110001 | A1* | 4/2018 | Yasukawa | H04W 52/0219 |
| 2021/0377916 | A1* | 12/2021 | Shi | H04W 24/02 |
| 2022/0217575 | A1* | 7/2022 | Wang | H04W 28/0268 |

OTHER PUBLICATIONS

3GPP TSG-RAN WG2#104 R2-1816981 Spokane, USA, Nov. 12-16, 2018 Title: Overall consideration on NR V2X resource allocation Source: ZTE, Sanechips (Year: 2018).*
3GPP RAN WG2 Meeting #104 R2-1817773 Spokane, USA, Nov. 12-16, 2018 Source: InterDigital Inc. (Year: 2018).*
3GPP TSG-RAN WG2 #104 R2-1818423 Spokane, USA, Nov. 12-16, 2018 Source : LG Electronics Inc. (Year: 2018).*
European Patent Application No. 19946545.1, Search and Opinion dated May 19, 2023, 10 pages.
3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15) Jan. 2019; 363 pages.
PCT/CN2019/107567 International Search Report, dated Jun. 23, 2020 2 pages.
CATT: "Mode 2 Resource Allocation", 3GPP Draft; R2-1816889, Spokane, USA, Nov. 2018, 4 pages.

* cited by examiner

METHOD AND APPARATUS FOR PROCESSING RESOURCES

CROSS-REFERENCE TO RELATED APPLICATION

This application is the US national phase application of International Application No. PCT/CN2019/107567, filed on Sep. 24, 2019, the entire contents of which are incorporated herein by reference.

TECHNICAL FIELD

The disclosure relates to the field of wireless communication technology, in particular to a method and an apparatus for processing resources, and a computer storage medium.

BACKGROUND

In order to support direct communication between user equipment (UEs), a sidelink communication mode has been introduced. A sidelink may also be referred to as a secondary link or a side link.

At present, a UE in the idle state may only use the broadcasted sidelink resource pool. The broadcasted sidelink resource pool needs to reserve resources, but the network cannot know service of the UE in the idle state, and thus cannot reasonably adjust the reserved resources, which may lead to low resource utilization or fierce competition for the use of reserved resources.

SUMMARY

According to a first aspect of the disclosure, a method for processing resources, is provided. The method is performed by a base station, and includes:
  configuring a first sidelink resource pool and a second sidelink resource pool, wherein the first sidelink resource pool is a resource pool of sidelinks that can be used by a user equipment (UE) after entering an idle state or an inactive state, and the second sidelink resource pool is a resource pool of sidelinks that can be used by the UE in the idle state or the inactive state after the first sidelink resource pool is released;
  sending information of the first sidelink resource pool and information of the second sidelink resource pool to the UE.

According to a second aspect of the present disclosure, a method for processing resources is provided. The method is performed by a UE, and includes:
  receiving information of a first sidelink resource pool and information of a second sidelink resource pool;
  storing the information of the first sidelink resource pool and the information of the second sidelink resource pool;
  after entering an idle state or an inactive state, using resources in the first sidelink resource pool for sidelink data transmission;
  after the first sidelink resource pool is released, using resources in the second sidelink resource pool for sidelink data transmission.

According to a third aspect of the present disclosure, a base station is provided. The base station includes:
  a processor;
  a memory configured to store instructions executable by the processor;
  wherein, the processor is configured to implement the method for processing resources described in the first aspect by executing the instructions.

According to a fourth aspect of the present disclosure, a UE is provided. The apparatus includes:
  a processor;
  a memory configured to store instructions executable by the processor;
  wherein, the processor is configured to implement the method for processing resources described in the second aspect by executing the instructions.

It should be understood that the above general description and the following detailed description are only exemplary and explanatory, and cannot limit the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Example embodiments will be explained in detail here, and examples are shown in the attached drawings. Where the following description relates to appended drawings, the same numbers in different appended drawings indicate the same or similar elements, unless otherwise indicated. Implementations described in the following example embodiments do not represent all implementations consistent with the present invention. Rather, they are merely examples of devices and methods which are consistent with some aspects of the invention as detailed in the attached claims.

The terms used in embodiments of the disclosure are intended merely to describe a particular embodiment and are not intended to limit embodiments of the disclosure. The singular forms "one", "a" and "the" used in embodiments of the disclosure and the attached claims are also intended to include majority forms, unless the context clearly indicates otherwise. It should also be understood that the terms "and/or" used herein refer to and include any or all possible combinations of one or more associated listed items.

It should be understood that, although terms first, second, third, etc., may be used in embodiments of the disclosure to describe various information, such information should not be limited to those terms. These terms are used only to distinguish information of the same type from one another. For example, without departing from the scope of embodiments of the disclosure, first information may also be referred to as second information, and similarly, second information may also be referred to as first information. Depending on the context, the words "if" used here can be interpreted as "when . . . " or "in a case that . . . " or "in response to determining".

Figures 1, 2:
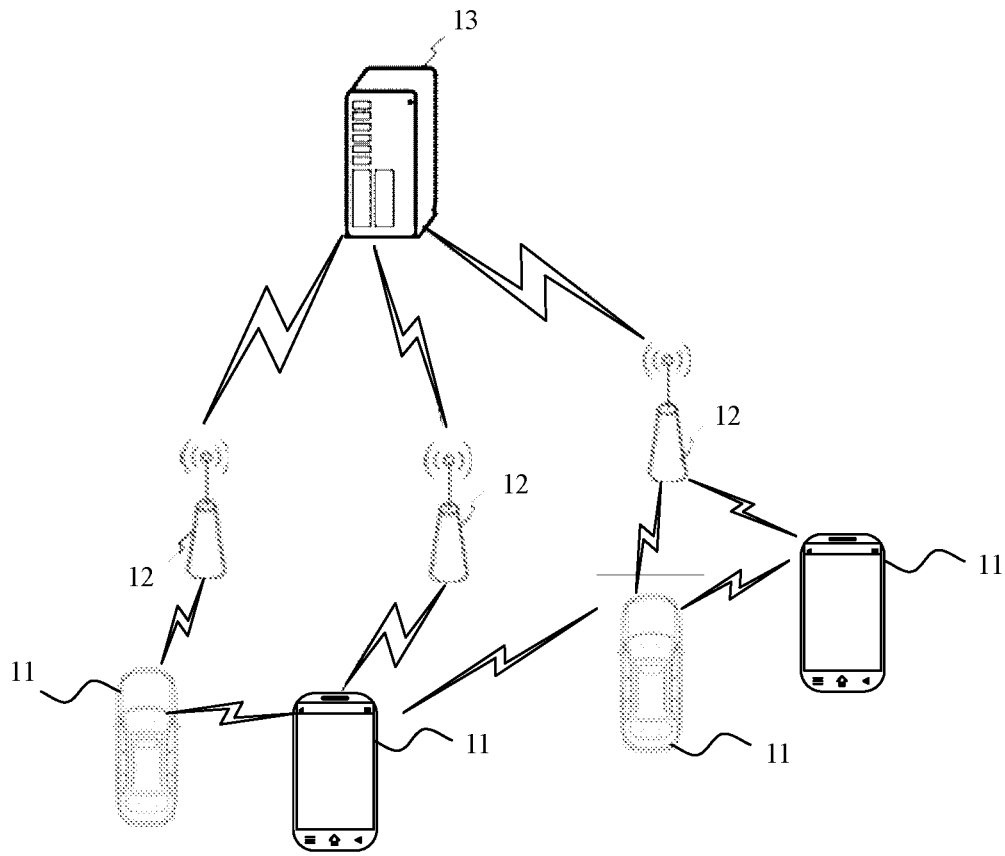
FIG. 1 is a schematic diagram of a wireless communication system according to an example embodiment.
FIG. 2 is a flowchart 1 of a method for processing resources according to an example embodiment.

Refer to FIG. 1, which shows a schematic diagram of a wireless communication system provided by embodiments of the disclosure. As shown in FIG. 1, the wireless communication system is a communication system based on cellular mobile communication technology. The wireless communication system can include several terminals 11 and several base stations 12.

The terminal 11 may be a device that provides voice and/or data connectivity to users. The terminal 11 can communicate with one or more core networks over a Radio Access Network (RAN), and the terminal 11 may be IoT terminals such as sensor devices, mobile phones (or "cellular" phones), and computers with IoT terminals, for example, which may be stationary, portable, pocket, handheld, computer-built or vehicle-mounted devices. For example, station, STA, subscriber unit, subscriber station, mobile station, mobile, remote station, access point, remote terminal, access terminal, user terminal, user agent, user device, or user equipment (UE). Alternatively, the terminal 11 may also be an unmanned vehicle. Alternatively, the terminal 11 may also be an on-board device, for example, a driving computer with wireless communication capabilities, or a wireless communication device connected to an external driving computer. Alternatively, the terminal 11 may also be a roadside device, such as a street lamp, signal light, or other roadside device with wireless communication capabilities.

The base station 12 may be a network side device in a wireless communication system. The wireless communication system may be the 4th generation mobile communication (4G) system, also known as Long Term Evolution (LTE) system. Alternatively, the wireless communication system may be a 5G system, also known as a New Radio (NR) system or a 5G NR system. Alternatively, the wireless communication system may be the next generation of 5G systems. The access network in 5G system may be called NG-RAN (New Generation-Radio Access Network). Alternatively, the wireless communication system may be a machine-type Communication (MTC) system.

The base station 12 may be an evolved base station (eNB) used in 4G systems. Alternatively, the base station 12 may also be a base station with a centralized distributed architecture (gNB) in 5G systems. When the base station 12 adopts a centralized distributed architecture, it usually includes a central unit (CU) and at least two distributed units (DUs). The centralized unit is set with protocol stacks of Packet Data Convergence Protocol (PDCP) layer, Radio Link Control (RLC) layer, Media Access Control (Media Access Control) layer. The distributed unit is provided with a Physical (PHY) layer protocol stack. The specific implementation of the base station 12 is not limited in embodiments of the disclosure.

A wireless connection may be established between the base station 12 and the terminal 11 through a radio-based air interface. In different implementations, the radio-based air interface is based on the fourth generation mobile communication network technology (4G) standard; or, the radio-based air interface is based on the fifth generation mobile communication network technology (5G) standard, such as the radio-based air interface is a new air interface; or, the radio air interface may be based on the next generation mobile network technology standards of 5G.

In some embodiments, an E2E (End to End) connection may also be established between terminals 11, for example, in vehicle-to-vehicle (V2V), vehicle-to-Infrastructure (V2I), and vehicle-to-pedestrian (V2P) communication in Vehicle to Everything (V2X) communication scenarios.

In some embodiments, the wireless communication system may also include a network management device 13.

Several base stations 12 are connected with the network management device 13 respectively. The network management device 13 may a core network device in a wireless communication system. For example, the network management device 13 may be a Mobility Management Entity (MME) in Evolved Packet Core (EPC) networks. Alternatively, the network management device may be other core network devices, such as the Serving Gate Way (SGW), Public Data Network Gate Way (PGW), Policy and Charging Rules Function (PCRF) or Home Subscriber Server (HSS), etc. The implementation form of the network management device 13 is not limited in embodiments of the disclosure.

In the 4G era, in order to support direct communication between UEs, a sidelink communication method was introduced. The interface between the UEs is a computer interface, such as a PC-5 interface. The transmission of the sidelink realizes addressing through the source identifier and the destination identifier of the media access control (MAC) layer, and there is no need to establish a connection before transmission.

There are two allocation methods for the transmission resources of the sidelink, one is the UE's autonomous selection method based on the resource pool, and the other is the network-based dynamic scheduling method.

The sidelink resource pool can be configured to the UE through broadcast or dedicated signaling. The sidelink resource pool configured to the UE through the dedicated signaling can only be used in the connected state. When the UE enters the idle state, the sidelink resource pool configured by the dedicated signaling will be deleted, and the dedicated signaling used is an RRC reconfiguration message.

The base station configures a special sidelink resource pool (exceptional pool) for the UE. When the UE cannot obtain the sidelink transmission resources in a short time, the UE can use the resources in the exceptional pool for sidelink transmission.

In the 5G era, a new state—inactive state is introduced. The base station may send an RRC release message to the UE in the connected state, to control the UE to enter the inactive state. In the inactive state, the base station retains the context of the UE, and the base station configures a Radio Access Network (RAN) area for the UE. The RAN area may be composed of one or more cells, and the UE can perform cell reselection in the RAN area. When the UE leaves the RAN area, the UE needs to enter the connected state to update the RAN area. When the UE needs to communicate with the base station, it needs to re-enter the connected state. When downlink data arrives, the network can broadcast a RAN paging message, which carries a UE identifier (I-RNTI), in the RAN area to page the UE, and the UE enters the connected state through the Resume process.

At present, the UE in the idle state can only use the broadcast sidelink resource pool. The broadcasted sidelink resource pool needs to reserve resources, but the network cannot know the service of the UE in the idle state, and thus cannot reasonably adjust the reserved resources, which may lead to low resource utilization rate.

Based on the above wireless communication system, in order to improve the resource utilization rate, various embodiments of the method of the present disclosure are proposed.

FIG. 2 is a flowchart 1 of a method for processing resources according to an example embodiment. As shown in FIG. 2, the method for processing resources is applied in a base station and includes the following steps.

In step S11, a first sidelink resource pool and a second sidelink resource pool are configured. The first sidelink resource pool is a resource pool of sidelinks that can be used by a user equipment (UE) after entering an idle state or an inactive state, and the second sidelink resource pool is a resource pool of sidelinks that can be used by the UE in the idle state or the inactive state after the first sidelink resource pool is released.

A priority of the first sidelink resource pool is higher than a priority of the second sidelink resource pool.

That is to say, in a case that there is both the first sidelink resource pool and the second sidelink resource pool, the UE uses the resources of the first sidelink resource pool to send sidelink data. In a case that there is only the second sidelink resource pool, the UE uses the resources of the second sidelink resource pool to send sidelink data.

In step S12, information of the first sidelink resource pool and information of the second sidelink resource pool are sent to the UE.

In this way, the base station configures the first sidelink resource pool and the second sidelink resource pool for the UE, and sends the information of the first sidelink resource pool and the information of the second sidelink resource pool to the UE, so that when the UE enters the idle state or the inactive state, the UE uses the dedicated sidelink resources for sidelink data transmission instead of using the sidelink resources broadcast by the base station, reducing competitors for UEs that are not allocated dedicated sidelink resources. Since the base station knows which UEs have allocated sidelink resources, the base station can adjust, recover and reallocate sidelink resources based on the allocation situation, so as to improve resource utilization.

In an embodiment, sending the information of the first sidelink resource pool and the information of the second sidelink resource pool to the UE includes:
  sending an RRC reconfiguration message or an RRC release message carrying the information of the first sidelink resource pool and the information of the second sidelink resource pool.

In this way, the information of the first sidelink resource pool and the information of the second sidelink resource pool can be sent to the UE through the RRC reconfiguration message or the RRC release message, so as to inform the UE of the information of sidelink resources allocated by the base station for the UE. By indicating the information of the first sidelink resource pool and the information of the second sidelink resource pool through the existing signaling that can configure the UE, such as the RRC reconfiguration message or the RRC release message, the number of signaling can be saved.

In an embodiment, sending the information of the first sidelink resource pool and the information of the second sidelink resource pool to the UE includes:
  sending a dedicated signaling carrying the information of the first sidelink resource pool and the information of the second sidelink resource pool.

Here, the dedicated signaling may be a signaling specially defined for sending the information of the first sidelink resource pool and the information of the second sidelink resource pool.

In this way, the information of the first sidelink resource pool and the information of the second sidelink resource pool can be sent to the UE through dedicated signaling, so as to inform the UE of the information of sidelink resources allocated by the base station for the UE.

In the above solution, the method further includes:
  sending usage duration information of the first sidelink resource pool.

It should be noted that the usage duration can be set or adjusted according to the actual situation or design requirements.

In this way, by sending the usage duration information, the UE can be informed of the effective usage duration of the resources in the first sidelink resource pool allocated to the UE, so that the resources in the first sidelink resource pool can be prevented from being occupied for a long time, and the resources in the first sidelink resource pool can be recovered and reallocated, which improves resource utilization.

Further, the method further includes:
  configuring a timer for the first sidelink resource pool according to the duration information; and
  in response to a timeout of the timer, releasing the first sidelink resource pool.

In this way, it is possible to reduce resource waste caused by being occupied for a long time.

In an embodiment, the method further includes:
  sending a Radio Access Network (RAN) paging message to the UE in the inactive state, the RAN paging message carrying information instructing the UE to delete the first sidelink resource pool.

In this way, the information of deleting the first sidelink resource pool can be sent to the UE through the RAN paging message, so as to inform the UE that the base station will recover the resources of the first sidelink resource pool allocated for the UE.

In an embodiment, the method further includes:
  sending a paging message to the UE in the idle state, the paging message carrying information instructing the UE to delete the first sidelink resource pool.

In this way, the information of deleting the first sidelink resource pool can be notified to the UE through the paging message, so as to inform the UE that the base station will recover the resources of the first sidelink resource pool allocated for the UE.

In the technical solutions described in embodiments of the present disclosure, the base station configures the first sidelink resource pool and the second sidelink resource pool, and sends the information of the first sidelink resource pool and the information of the second sidelink resource pool to the UE. The UE is allocated the resource pool of sidelinks that the UE can use after entering the idle state or the inactive state, so that the UE can use the dedicated sidelink resources for sidelink data transmission when entering the idle state or the inactive state, instead of using the sidelink resources broadcast by the base station, which reduces the competitors of UEs that have not been allocated dedicated sidelink resources. Since the base station knows which UEs are allocated the sidelink resources, the base station can reasonably adjust and recover the sidelink resources based on the allocation situation, which improves the resource utilization.

Figure 3:
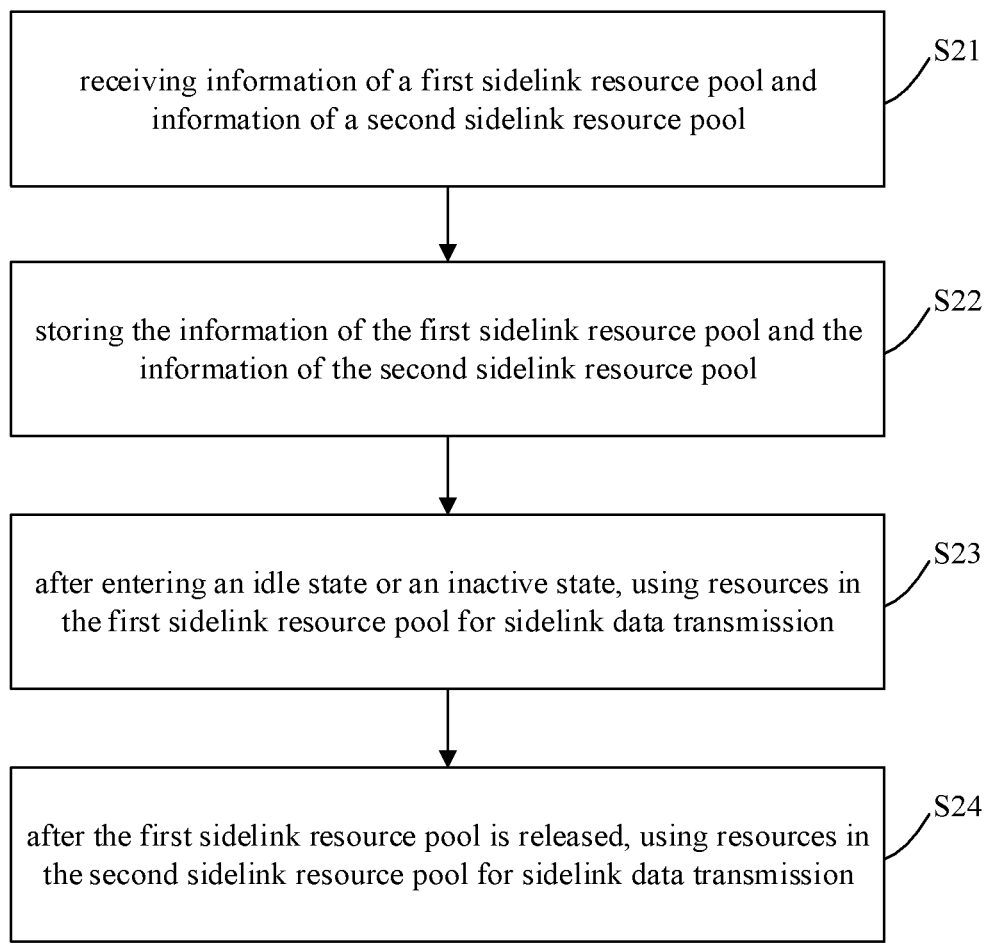
FIG. 3 is a flowchart 2 of a method for processing resources according to an example embodiment.

FIG. 3 is a flowchart 2 of a method for processing resources according to an example embodiment. As shown in FIG. 3, the method for processing resources is applied in a user equipment (UE) and includes the following steps.

In step S21, information of a first sidelink resource pool and information of a second sidelink resource pool are received.

As an implementation, receiving the information of the first sidelink resource pool and the information of the second sidelink resource pool includes:

receiving an RRC reconfiguration message or an RRC release message carrying the information of the first sidelink resource pool and the information of the second sidelink resource pool.

In this way, through the received RRC reconfiguration message or RRC release message, the information of sidelink resources allocated by the base station can be known.

As an implementation, receiving the information of the first sidelink resource pool and the information of the second sidelink resource pool includes:

receiving a dedicated signaling carrying the information of the first sidelink resource pool and the information of the second sidelink resource pool.

Here, the dedicated signaling may be a signaling specially defined for sending the information of the first sidelink resource pool and the information of the second sidelink resource pool.

In this way, the information of sidelink resources allocated by the base station can be obtained through the received dedicated signaling.

In step S22, the information of the first sidelink resource pool and the information of the second sidelink resource pool are stored.

In step S23, after entering an idle state or an inactive state, resources in the first sidelink resource pool is used for sidelink data transmission.

In step S24, after the first sidelink resource pool is released, resources in the second sidelink resource pool is used for sidelink data transmission.

After entering the idle state or inactive state, the resources in the first sidelink resource pool are used to send sidelink data; after the first sidelink resource pool is released, the resources in the second sidelink resource pool are used to send sidelink data. In this way, the UE can have sidelink resources available for use in the idle state or inactive state, and can choose to use different sidelink resources according to actual situation, which ensures the smooth transmission of sidelink data.

As an implementation, before the first sidelink resource pool is released, the method further includes:

ignoring broadcasted information of a third sidelink resource pool, in which the third sidelink resource pool is a resource pool of sidelinks that can be used by the UE in the idle state or the inactive state.

In an embodiment, ignoring the broadcasted information of the third sidelink resource pool includes:

receiving the information of the third sidelink resource pool broadcasted by the base station, reading the information of the third sidelink resource pool but not storing the information of the third sidelink resource pool.

In an embodiment, ignoring the broadcast information of the third sidelink resource pool includes:

receiving the information of the third sidelink resource pool broadcasted by the base station, but not reading the information of the third sidelink resource pool.

In this way, since the base station has allocated the first resource pool and the second resource pool to the UE, the UE ignores the third resource pool broadcast by the base station and does not use the resources of the third resource pool, which provides convenience for other UEs to use the resources of the third resource pool.

In an embodiment, the method further includes:
receiving usage duration information of the first sidelink resource pool.

After entering the idle state or the inactive state, using the resources in the first sidelink resource pool for sidelink data transmission includes:

after entering the inactive state and being within the range of the usage duration information, using the resources in the first sidelink resource pool for the sidelink data transmission.

In this way, the UE can utilize the resources of the first sidelink resource pool within the range of the usage duration.

In an embodiment, the method further includes:
configuring a timer for the first sidelink resource pool according to the usage duration information; and
starting the timer in response to the UE leaving a connected state.

That is to say, when the UE enters the idle state or the inactive state, the timer is used to count the time.

In an embodiment, when the UE is in the inactive state, the method further includes:

in response to detecting that the UE leaves the RAN area, deleting the stored information of the first sidelink resource pool and the stored information of the second sidelink resource pool.

When the UE enters the idle state or the inactive state, the first sidelink resource pool is timed through the timer, and when the stored information of the first sidelink resource pool and the stored information of the second sidelink resource pool are deleted, the timer is stopped.

In this way, the UE can release the resources of the first sidelink resource pool and the second link resource pool that do not match the current area in time, so as to facilitate the resources of the first sidelink resource pool and the second sidelink resource pool to be recovered and reallocated, to improve the resource utilization.

In an embodiment, when the UE is in the inactive state, the method further includes:

receiving a RAN paging message, the RAN paging message carrying information instructing the UE to delete the first sidelink resource pool;
deleting the information of the first sidelink resource pool based on the RAN paging message.

When the UE enters the idle state or the inactive state, the first sidelink resource pool is timed through the timer, and when the information of the first sidelink resource pool is deleted based on the RAN paging message, the timer is stopped.

In this way, the information of the first sidelink resource pool can be deleted based on the RAN paging message, and the resources of the first sidelink resource pool can be released, so that the resources of the first sidelink resource pool can be recovered and reallocated, thereby improving the resource utilization.

In an embodiment, when the UE is in the idle state, the method further includes:

in response to detecting that the UE leaves a tracking (TA) area, deleting the stored information of the first sidelink resource pool and the stored information of the second sidelink resource pool.

When the UE enters the idle state or the inactive state, the first sidelink resource pool is timed through the timer, and when the stored information of the first sidelink resource pool and the stored information of the second sidelink resource pool are deleted, the timer is stopped.

In this way, the UE can release the resources of the first sidelink resource pool and the second link resource pool that do not match the current area in time, so that the base station can reallocate the resources of the first sidelink resource pool and the second link resource pool to other UEs, thereby improving the utilization rate of sidelink resources.

In an embodiment, when the UE is in the idle state, the method further includes:
  receiving a paging message, the paging message carrying information instructing the UE to delete the first sidelink resource pool;
  deleting the information of the first sidelink resource pool based on the paging message.

When the UE enters the idle state or the inactive state, the first sidelink resource pool is timed through the timer, and when the information of the first sidelink resource pool is deleted based on the paging message, the timer is stopped.

In this way, the information of the first sidelink resource pool can be deleted based on the paging message, and the resources of the first sidelink resource pool can be released.

In an embodiment, the method further includes:
  after the information of the first sidelink resource pool is deleted, using the resources in the second sidelink resource pool for sidelink data transmission until sidelink resources other than the resources in the second sidelink resource pool are obtained.

In this way, it can be ensured that the UE in the idle state or the inactive state has available sidelink resources.

In a specific implementation, after the information of the first sidelink resource pool is deleted, the information of the third sidelink resource pool broadcasted by the base station is received, and based on the information of the third sidelink resource pool, available sidelink resources are determined.

In a specific implementation, after the information of the first sidelink resource pool is deleted, the base station is requested for available sidelink resources.

It should be noted that, the manner of obtaining sidelink resources other than the resources in the second sidelink resource pool is not limited in this embodiment.

In an embodiment, the method includes:
  after obtaining the sidelink resources other than the resources in the second sidelink resource pool, deleting the stored information of the second sidelink resource pool.

In this way, it can be ensured that the UE in the idle state or the inactive state has available sidelink resources.

In the technical solutions described in embodiments of the present disclosure, the information of the first sidelink resource pool and the information of the second sidelink resource pool are received; the information of the first sidelink resource pool and the information of the second sidelink resource pool are stored; after entering the idle state or inactive state, the resources in the first sidelink resource pool are used for sidelink data transmission; and after the first sidelink resource pool is released, the resources in the second sidelink resource pool is used for sidelink data transmission. In this way, the UE can have sidelink resources available for use in the idle state or the inactive state, and can use different sidelink resources according to different options in actual situations.

Figure 4:
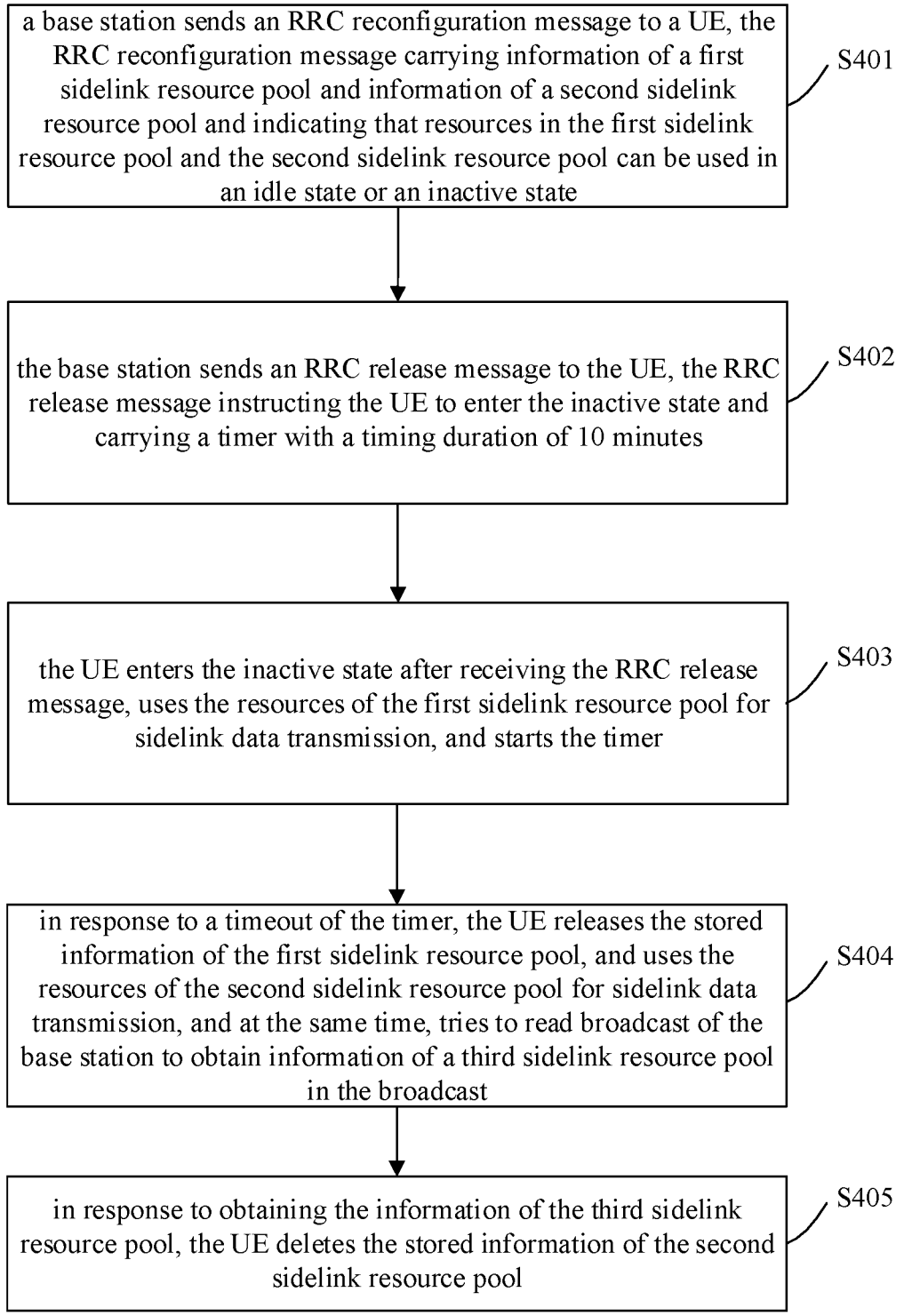
FIG. 4 is a flowchart 1 of resource processing according to an example embodiment.

FIG. 4 is a flow chart 1 of resource processing according to an example embodiment, which includes the following steps.

In step S401, a base station sends an RRC reconfiguration message to a UE, the RRC reconfiguration message carrying information of a first sidelink resource pool and information of a second sidelink resource pool and indicating that resources in the first sidelink resource pool and the second sidelink resource pool can be used in an idle state or an inactive state.

In step S402, the base station sends an RRC release message to the UE, the RRC release message instructing the UE to enter the inactive state and carrying a timer with a timing duration of 10 minutes.

In step S403, the UE enters the inactive state after receiving the RRC release message, uses the resources of the first sidelink resource pool for sidelink data transmission, and starts the timer.

In step S404, in response to a timeout of the timer, the UE releases the stored information of the first sidelink resource pool, and uses the resources of the second sidelink resource pool for sidelink data transmission, and at the same time, tries to read broadcast of the base station to obtain information of a third sidelink resource pool in the broadcast.

In step S405, in response to obtaining the information of the third sidelink resource pool, the UE deletes the stored information of the second sidelink resource pool.

In the solution described in this embodiment, when the UE is in the inactive state, there are sidelink resources available for the UE to use.

Figure 5:
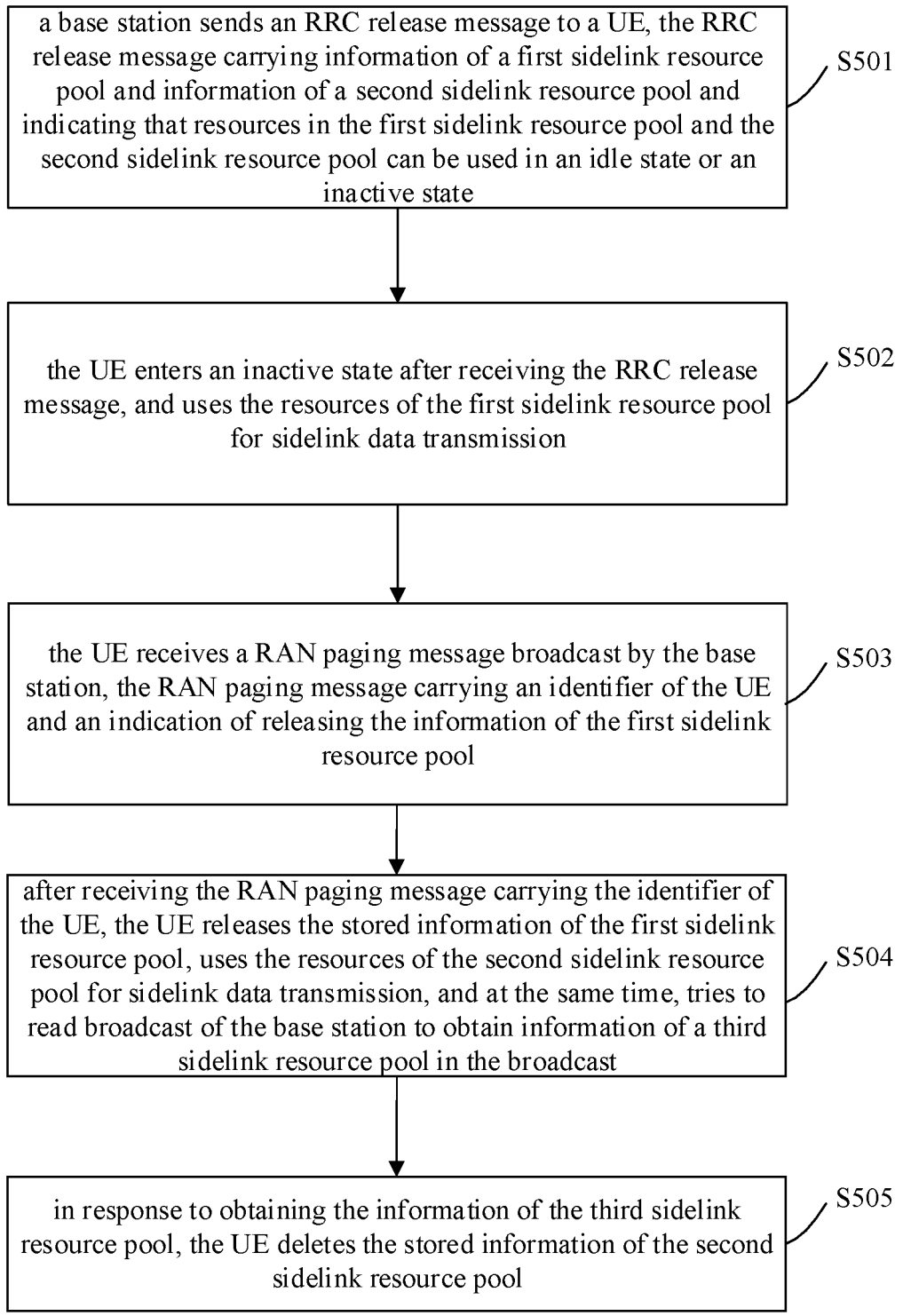
FIG. 5 is a flowchart 2 of resource processing according to an example embodiment.

FIG. 5 is a flowchart 2 of resource processing according to an example embodiment, which includes the following steps.

In step S501, a base station sends an RRC release message to a UE, the RRC release message carrying information of a first sidelink resource pool and information of a second sidelink resource pool and indicating that resources in the first sidelink resource pool and the second sidelink resource pool can be used in an idle state or an inactive state.

In step S502, the UE enters an inactive state after receiving the RRC release message, and uses the resources of the first sidelink resource pool for sidelink data transmission.

In step S503, the UE receives a RAN paging message broadcast by the base station, the RAN paging message carrying an identifier of the UE and an indication of releasing the information of the first sidelink resource pool.

In step S504, after receiving the RAN paging message carrying the identifier of the UE, the UE releases the stored information of the first sidelink resource pool, uses the resources of the second sidelink resource pool for sidelink data transmission, and at the same time, tries to read broadcast of the base station to obtain information of a third sidelink resource pool in the broadcast.

In step S505, in response to obtaining the information of the third sidelink resource pool, the UE deletes the stored information of the second sidelink resource pool.

In the solution described in this embodiment, when the UE is in the inactive state, there are sidelink resources available for the UE to use.

Figure 6:
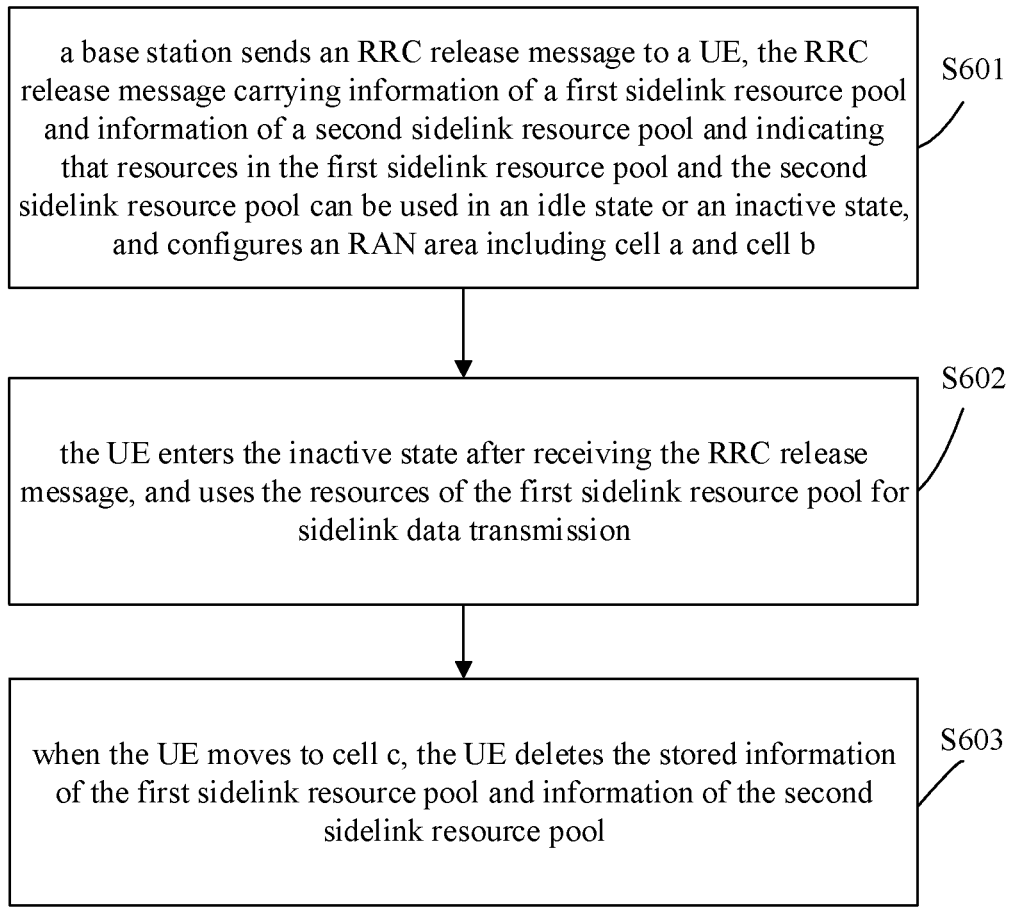
FIG. 6 is a flowchart 3 of resource processing according to an example embodiment.

FIG. 6 is a flowchart 3 of resource processing according to an example embodiment, which includes following steps.

In step S601, a base station sends an RRC release message to a UE, the RRC release message carrying information of a first sidelink resource pool and information of a second sidelink resource pool and indicating that resources in the first sidelink resource pool and the second sidelink resource pool can be used in an idle state or an inactive state, and configures an RAN area including cell a and cell b.

In step S602, the UE enters the inactive state after receiving the RRC release message, and uses the resources of the first sidelink resource pool for sidelink data transmission.

In step S603, when the UE moves to cell c, the UE deletes the stored information of the first sidelink resource pool and information of the second sidelink resource pool.

In the solution described in this embodiment, when the UE is in the inactive state, there are sidelink resources available for the UE to use.

Figure 7:
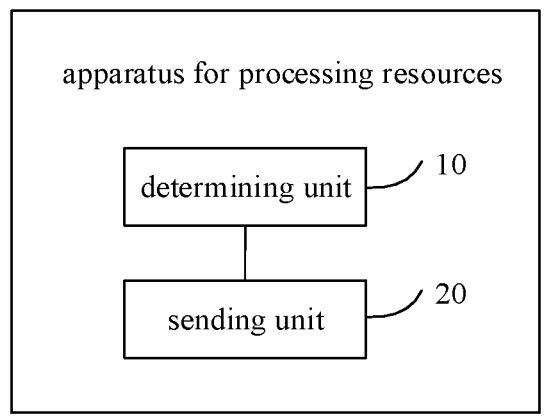
FIG. 7 is a block diagram 1 of an apparatus for processing resources according to an example embodiment.

FIG. 7 is a block diagram 1 of an apparatus for processing resources according to an example embodiment. The apparatus for processing resources is applied to a base station, and referring to FIG. 7, the apparatus includes a determining unit 10 and a sending unit 20.

The determining unit 10 is configured to configure a first sidelink resource pool and a second sidelink resource pool. The first sidelink resource pool is a resource pool of sidelinks that can be used by a user equipment (UE) after entering an idle state or an inactive state, and the second sidelink resource pool is a resource pool of sidelinks that can be used by the UE in the idle state or the inactive state after the first sidelink resource pool is released.

The sending unit 20 is configured to send information of the first sidelink resource pool and information of the second sidelink resource pool to the UE.

In an implementation, the sending unit 20 is configured to:
send a radio resource control (RRC) reconfiguration message or an RRC release message carrying the information of the first sidelink resource pool and the information of the second sidelink resource pool.

In an implementation, the sending unit 20 is further configured to send usage duration information of the first sidelink resource pool.

In an implementation, the determining unit 10 is further configured to:
configure a timer for the first sidelink resource pool according to the duration information;
in response to timeout of the timer, release the first sidelink resource pool.

In an implementation, the sending unit 20 is further configured to:
send a radio access network (RAN) paging message to the UE in the inactive state, the RAN paging message carrying information instructing the UE to delete the first sidelink resource pool.

In an implementation, the sending unit 20 is further configured to:
send a paging message to the UE in the idle state, the paging message carrying information instructing the UE to delete the first sidelink resource pool.

Regarding the apparatus in the above embodiments, the specific manner in which each module performs operations has been described in detail in embodiments of the method, and will not be described in detail here.

In practical applications, the specific structures of the determining unit 10 and the sending unit 20 may be implemented by the central processing unit (CPU), the micro controller unit (MCU) the digital signal processor (DSP) or the programmable logic controller (PLC) in the apparatus for processing resources or the base station to which the apparatus for processing resources belongs.

The apparatus for processing resources described in this embodiment may be applied on the base station side.

Those skilled in the art should understand that the functions of each processing module in the apparatus for processing resources of embodiments of the present disclosure can be understood by referring to the foregoing description of the method for processing resources applied to the base station side. Each module in the apparatus for processing resources of embodiments of the present disclosure may be implemented by an analog circuit that implements the functions described in the embodiments of the present disclosure, and may also be implemented by running software on a terminal that implements the functions described in the embodiments of the present disclosure.

The apparatus for processing resources described in embodiments of the present disclosure allocates the resource pool of sidelinks that can be used after entering the idle state or the inactive state for the UE, and allocates and reserves the sidelink resources for some UEs in a targeted manner, which can reduce the competition between UEs for the broadcast reserved sidelink resources. Since the base station knows the reserved resources allocated for each UE, it can reasonably adjust, recover or reallocate the reserved resources based on the allocation situation, which improves the resource utilization rate.

Figure 8:
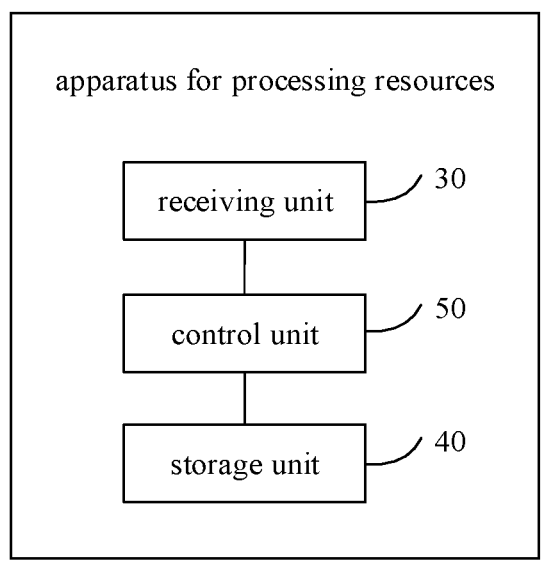
FIG. 8 is a block diagram 2 of an apparatus for processing resources according to an example embodiment.

FIG. 8 is a block diagram 2 of an apparatus for processing resources according to an example embodiment. The apparatus for processing resources is applied to the UE side. With reference to FIG. 8, the apparatus includes a receiving unit 30, a storage unit 40 and a control unit 50.

The receiving unit 30 is configured to receive information of a first sidelink resource pool and information of a second sidelink resource pool.

The storage unit 40 is configured to store the information of the first sidelink resource pool and the information of the second sidelink resource pool.

The control unit 50 is configured to, after a UE enters an idle state or an inactive state, use resources in the first sidelink resource pool for sidelink data transmission.

The control unit 50 is further configured to, after the first sidelink resource pool is released, use resources in the second sidelink resource pool for sidelink data transmission.

In the above solution, the control unit 50 is further configured to:
before the first sidelink resource pool is released, ignore broadcasted information of a third sidelink resource pool, wherein the third sidelink resource pool is a resource pool of sidelinks that can be used by the UE in the idle state or the inactive state.

In the above solution, the receiving unit 30 is configured to: receive an RRC reconfiguration message or an RRC release message carrying the information of the first sidelink resource pool and the information of the second sidelink resource pool.

In the above solution, the receiving unit 30 is further configured to receive usage duration information of the first sidelink resource pool;
the control unit 50 is further configured to:
after entering the inactive state and being within a range of the usage duration information, use the resources in the first sidelink resource pool for sidelink data transmission.

In the above solution, the control unit 50 is further configured to:
configure a timer for the first sidelink resource pool according to the usage duration information;
start the timer in response to the UE leaving a connected state.

In the above solution, the control unit 50 is further configured to:
in a case that the UE is in the inactive state, in response to detecting that the UE leaves a RAN area, delete the stored information of the first sidelink resource pool and the stored information of the second sidelink resource pool.

In the above solution, the receiving unit 30 is further configured to receive a RAN paging message, the RAN paging message carrying information instructing the UE to delete the first sidelink resource pool;

the control unit 50 is further configured to delete the information of the first sidelink resource pool based on the RAN paging message, in a case that the UE is in the inactive state.

In the above solution, the control unit 50 is further configured to: in a case that the UE is in the idle state, in response to detecting that the UE leaves a tracking (TA) area, delete the stored information of the first sidelink resource pool and the stored information of the second sidelink resource pool.

In the above solution, the receiving unit 30 is further configured to receive a paging message, the paging message carrying information instructing the UE to delete the first sidelink resource pool;

the control unit 50 is further configured to delete the information of the first sidelink resource pool based on the paging message, in a case that the UE is in the idle state.

In the above solution, the control unit 50 is further configured to:

after deleting the information of the first sidelink resource pool, use the resources in the second sidelink resource pool for sidelink data transmission until sidelink resources other than the resources in the second sidelink resource pool are obtained.

In the above solution, the control unit 50 is further configured to:

delete the stored information of the second sidelink resource pool after obtaining the sidelink resources other than the resources in the second sidelink resource pool.

Regarding the apparatus in the above embodiments, the specific manner in which each module performs operations has been described in detail in embodiments of the method, and will not be described in detail here.

In practical applications, the specific structures of the receiving unit 30, the storage unit 40 and the control unit 50 may be implemented by the CPU, the MCU, the DSP or the PLC in the apparatus for processing resources or the terminal to which the apparatus for processing resources belongs.

The apparatus for processing resources described in this embodiment may be applied on the terminal side.

Those skilled in the art should understand that the functions of each processing module in the apparatus for processing resources of embodiments of the present disclosure can be understood by referring to the foregoing description of the method for processing resources applied to the base station side. Each module in the apparatus for processing resources of embodiments of the present disclosure may be implemented by an analog circuit that implements the functions described in the embodiments of the present disclosure, and may also be implemented by running software on a terminal that implements the functions described in the embodiments of the present disclosure.

The apparatus for processing resources described in embodiments of the present disclosure enables the UE to have sidelink resources available for use in the idle state or the inactive state, and to select and use different sidelink resources according to different actual situations.

Figure 9:
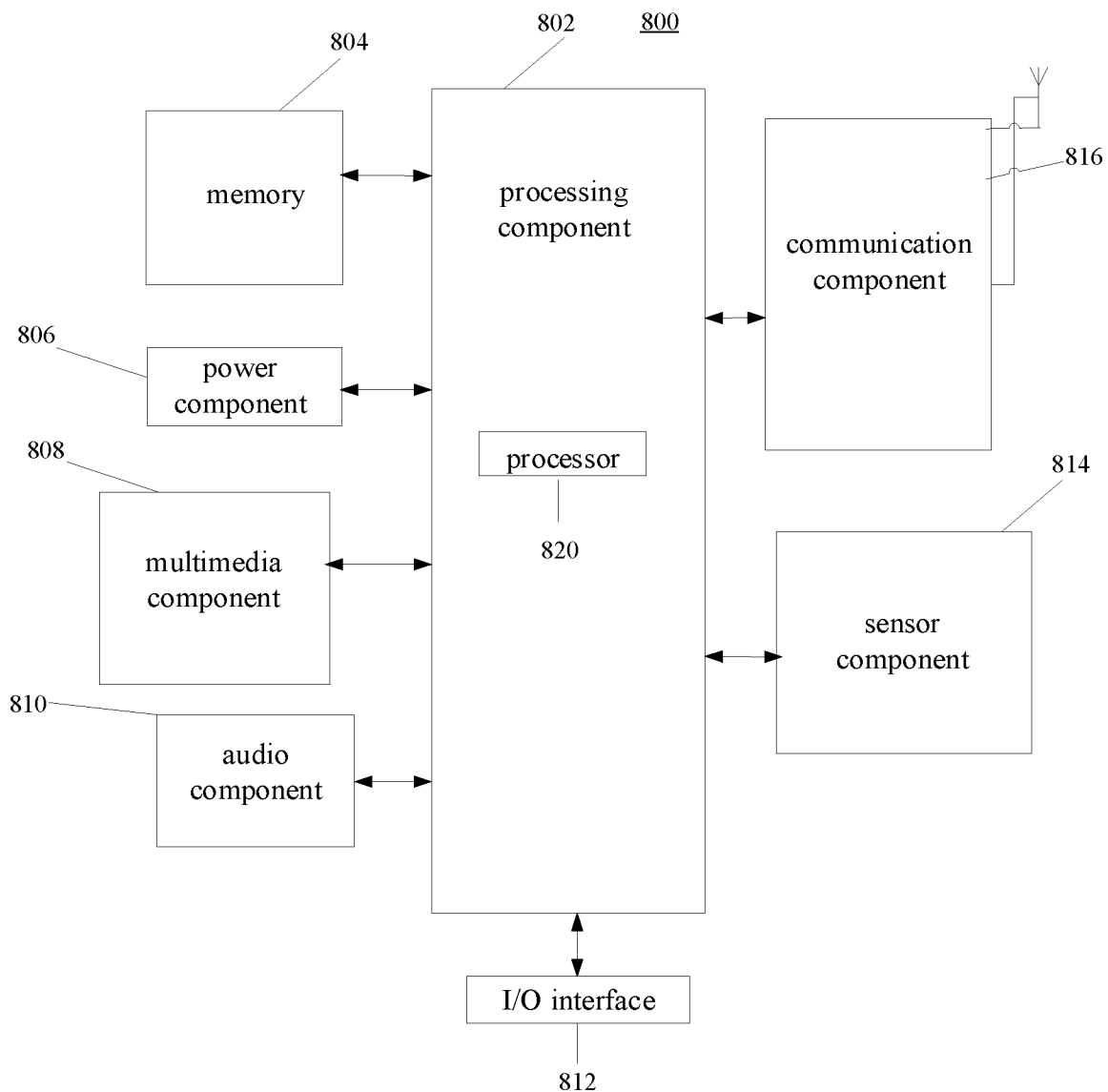
FIG. 9 is block diagram 1 of an apparatus for processing resources according to an example embodiment.

FIG. 9 is a block diagram of an apparatus 800 for implementing information processing according to an example embodiment of the disclosure. For example, the apparatus 800 may be a mobile phone, a computer, a digital broadcasting terminal, a messaging device, a game console, a tablet device, a medical equipment, a fitness equipment, a personal digital assistant, etc.

As illustrated in FIG. 8, the apparatus 800 may include one or more components: a processing component 802, a memory 804, a power component 806, a multimedia component 808, an audio component 810, an input/output (I/O) interface 812, a sensor component 814, and a communication component 816.

The processing component 802 typically controls overall operations of the apparatus 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the apparatus 800. Examples of such data include instructions for any applications or methods operated on the apparatus 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the apparatus 800. The power component 806 may include a power management system, one or more power sources, and any other components associated with the generation, management, and distribution of power in the apparatus 800.

The multimedia component 808 includes a screen providing an output interface between the apparatus 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the apparatus 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the apparatus 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the apparatus 800. For instance, the sensor component 814 may detect an open/closed status of the apparatus 800, relative positioning of components, e.g., the display and the keypad, of the apparatus 800, a change in position of the apparatus 800 or a component of the apparatus 800, a presence or absence of user contact with the apparatus 800, an orientation or an acceleration/deceleration of the apparatus 800, and a change in temperature of the apparatus 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 614 may also include an accelerometer sensor, a gyroscope sensor, a magnetic sensor, a pressure sensor, or a temperature sensor.

The communication component 816 is configured to facilitate communication, wired or wirelessly, between the apparatus 800 and other devices. The apparatus 800 can access a wireless network based on a communication standard, such as WiFi, 2G, or 3G, or a combination thereof. In one embodiment, the communication component 816 receives a broadcast signal or broadcast associated information from an external broadcast management system via a broadcast channel. In one embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an example embodiment, the apparatus 800 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, to perform the method for processing resources applied on the UE side as described in the above any embodiment.

In an example embodiment, there is also provided a non-transitory computer-readable storage medium including instructions, such as included in the memory 804, executable by the processor 820 in the apparatus 800, for performing the above-described methods. For example, the non-transitory computer-readable storage medium may be a ROM, a RAM, a CD-ROM, a magnetic tape, a floppy disc, an optical data storage device, and the like.

Figure 10:
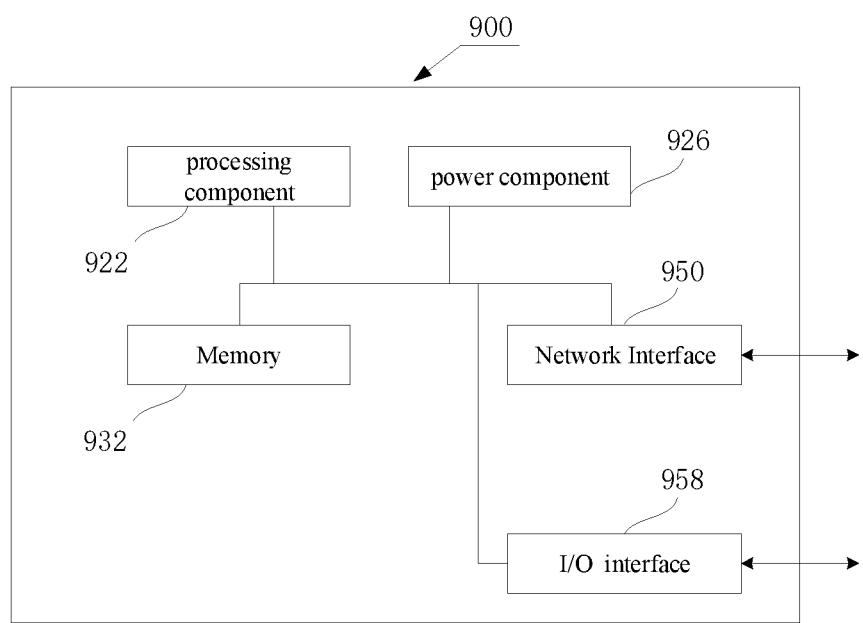
FIG. 10 is a block diagram 2 of an apparatus for processing resources according to an example embodiment.

FIG. 10 is a block diagram of an apparatus 900 for processing resources according to an example embodiment. For example, the apparatus 900 may be provided as a server. Referring to FIG. 10, the apparatus 900 includes a processing module 922, which in turn includes one or more processors, as well as memory resources represented by a memory 932, for storing instructions that can be executed by the processing module 922, such as applications. Applications stored in memory 932 may include one or more modules each corresponding to a set of instructions. In addition, the processing component 922 is configured to execute instructions to perform the above method for processing resources applied to the base station side.

The apparatus 900 may also include a power component 926 configured to perform power management of the apparatus 900, a wired or wireless network interface 950 configured to connect the apparatus 900 to the network, and an input/output (I/O) interface 958. The apparatus 900 can operate operating systems based on the memory 932, such as Windows Server™, Mac OS X™, Unix™, Linux™, FreeBSD™ or the like.

The technical solutions recorded in embodiments of the present disclosure may be arbitrarily combined without conflict.

After considering the specification and practicing the disclosure herein, those skilled in the art will easily think of other embodiments of the present disclosure. The present application is intended to cover any variations, usages, or adaptive changes of the present disclosure. These variations, usages, or adaptive changes follow the general principles of the present disclosure and include common knowledge or conventional technical means in the technical field not disclosed by the present disclosure. The specification and embodiments are only be illustrative, and the true scope and spirit of the disclosure are indicated by the following claims.

It should be understood that the present disclosure is not limited to the precise structure described above and shown in the drawings, and various modifications and changes may be made without departing from its scope. The scope of the present application is only limited by the appended claims.

What is claimed is:

1. A method for processing resources, performed by a base station, comprising:
   configuring a first sidelink resource pool and a second sidelink resource pool, wherein the first sidelink resource pool is a resource pool of sidelinks that can be used by a user equipment (UE) after entering an idle state or an inactive state, and the second sidelink resource pool is a resource pool of sidelinks that can be used by the UE in the idle state or the UE in the inactive state after the first sidelink resource pool is released;
   sending information of the first sidelink resource pool and information of the second sidelink resource pool to the UE.

2. The method of claim 1, wherein sending the information of the first sidelink resource pool and the information of the second sidelink resource pool to the UE, comprises:
   sending a radio resource control (RRC) reconfiguration message or an RRC release message carrying the information of the first sidelink resource pool and the information of the second sidelink resource pool.

3. The method of claim 1, further comprising: sending usage duration information of the first sidelink resource pool.

4. The method of claim 3, further comprising:
   configuring a timer for the first sidelink resource pool according to the duration information;
   in response to timeout of the timer, releasing the first sidelink resource pool.

5. The method of claim 1, further comprising:
sending a radio access network (RAN) paging message to the UE in the inactive state, the RAN paging message carrying information instructing the UE to delete the first sidelink resource pool.

6. The method of claim 1, further comprising:
sending a paging message to the UE in the idle state, the paging message carrying information instructing the UE to delete the first sidelink resource pool.

7. A base station, comprising:
a processor;
a memory configured to store instructions executable by the processor;
wherein, the processor is configured to implement the method for processing resources of claim 1 by executing the instructions.

8. A method for processing resources, performed by a UE, comprising:
receiving information of a first sidelink resource pool and information of a second sidelink resource pool;
storing the information of the first sidelink resource pool and the information of the second sidelink resource pool;
after entering an idle state or an inactive state, using resources in the first sidelink resource pool for sidelink data transmission;
after the first sidelink resource pool is released, using resources in the second sidelink resource pool for sidelink data transmission.

9. The method of claim 8, wherein before the first sidelink resource pool is released, the method further comprises:
ignoring broadcasted information of a third sidelink resource pool, wherein the third sidelink resource pool is a resource pool of sidelinks that can be used by the UE in the idle state or the UE the inactive state.

10. The method of claim 8, wherein receiving the information of the first sidelink resource pool and the information of the second sidelink resource pool comprises:
receiving an RRC reconfiguration message or an RRC release message carrying the information of the first sidelink resource pool and the information of the second sidelink resource pool.

11. The method of claim 8, further comprising:
receiving usage duration information of the first sidelink resource pool;
after entering the idle state or the inactive state, using resources in the first sidelink resource pool for sidelink data transmission, comprises:
after entering the inactive state and being within a range of the usage duration information, using the resources in the first sidelink resource pool for sidelink data transmission.

12. The method of claim 11, further comprising:
configuring a timer for the first sidelink resource pool according to the usage duration information;
starting the timer in response to the UE leaving a connected state.

13. The method of claim 8, wherein in a case that the UE is in the inactive state, the method further comprises:
in response to detecting that the UE leaves a RAN area, deleting the stored information of the first sidelink resource pool and the stored information of the second sidelink resource pool.

14. The method of claim 8, wherein in a case that the UE is in the inactive state, the method further comprises:
receiving a RAN paging message, the RAN paging message carrying information instructing the UE to delete the first sidelink resource pool;
deleting the information of the first sidelink resource pool based on the RAN paging message.

15. The method of claim 8, wherein in a case that the UE is in the idle state, the method further comprises:
in response to detecting that the UE leaves a tracking (TA) area, deleting the stored information of the first sidelink resource pool and the stored information of the second sidelink resource pool.

16. The method of claim 8, wherein in a case that the UE is in the idle state, the method further comprises:
receiving a paging message, the paging message carrying information instructing the UE to delete the first sidelink resource pool;
deleting the information of the first sidelink resource pool based on the paging message.

17. The method of claim 8, further comprising:
after deleting the information of the first sidelink resource pool, using the resources in the second sidelink resource pool for sidelink data transmission until sidelink resources other than the resources in the second sidelink resource pool are obtained.

18. The method of claim 17, further comprising:
deleting the stored information of the second sidelink resource pool after obtaining the sidelink resources other than the resources in the second sidelink resource pool.

19. A UE, comprising:
a processor;
a memory configured to store instructions executable by the processor;
wherein, the processor is configured to:
receive information of a first sidelink resource pool and information of a second sidelink resource pool;
store the information of the first sidelink resource pool and the information of the second sidelink resource pool;
after entering an idle state or an inactive state, use resources in the first sidelink resource pool for sidelink data transmission;
after the first sidelink resource pool is released, use resources in the second sidelink resource pool for sidelink data transmission.

20. The UE of claim 19, wherein, the processor is further configured to:
before the first sidelink resource pool is released, ignore broadcasted information of a third sidelink resource pool, wherein the third sidelink resource pool is a resource pool of sidelinks that can be used by the UE in the idle state or the UE in the inactive state.

\* \* \* \* \*